US009761849B2

(12) United States Patent
Lim et al.

(10) Patent No.: US 9,761,849 B2
(45) Date of Patent: Sep. 12, 2017

(54) BATTERY MODULE

(75) Inventors: Young-Bin Lim, Yongin-si (KR); Hyun-Ye Lee, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 1219 days.

(21) Appl. No.: 13/067,406

(22) Filed: May 31, 2011

(65) Prior Publication Data

US 2012/0129038 A1 May 24, 2012

(30) Foreign Application Priority Data

Nov. 23, 2010 (KR) ........................ 10-2010-0116860

(51) Int. Cl.
| | |
|---|---|
| *H01M 2/18* | (2006.01) |
| *H01M 10/02* | (2006.01) |
| *H01M 2/10* | (2006.01) |
| *H01M 10/04* | (2006.01) |

(52) U.S. Cl.
CPC ........... *H01M 2/1077* (2013.01); *H01M 2/18* (2013.01); *H01M 10/02* (2013.01); *H01M 10/0481* (2013.01)

(58) Field of Classification Search
CPC .. H01M 2/1077; H01M 10/0481; H01M 2/18; H01M 10/02; Y02E 60/12

USPC ........................................................ 429/156
See application file for complete search history.

(56) References Cited

U.S. PATENT DOCUMENTS

| | | | | |
|---|---|---|---|---|
| 2004/0058233 | A1* | 3/2004 | Hamada et al. | 429/159 |
| 2006/0204840 | A1 | 9/2006 | Jeon et al. | |
| 2007/0026303 | A1* | 2/2007 | Jeon et al. | 429/143 |
| 2007/0133151 | A1* | 6/2007 | Jeon et al. | 361/600 |

FOREIGN PATENT DOCUMENTS

| | | |
|---|---|---|
| JP | 2006-253149 | 9/2006 |
| JP | 2009-081056 | 4/2009 |
| KR | 10-2006-0099216 A | 9/2006 |
| KR | 10-0709261 B1 | 4/2007 |
| KR | 10-2007-0101025 A | 10/2007 |
| KR | 10-2008-0034625 A | 4/2008 |

\* cited by examiner

*Primary Examiner* — Sarah A Slifka
*Assistant Examiner* — Seenam Agbetiafan
(74) *Attorney, Agent, or Firm* — Lee & Morse, P.C.

(57) ABSTRACT

A battery module includes a plurality of battery cells arranged in one direction, barriers interposed among the plurality of battery cells, a pair of first and second end plates arranged outside the battery cells, and coupling members that couple the first and second end plates, wherein at least one of the barriers includes at least one protrusion that provides a step difference between the protrusion and a surface of the barrier.

13 Claims, 5 Drawing Sheets

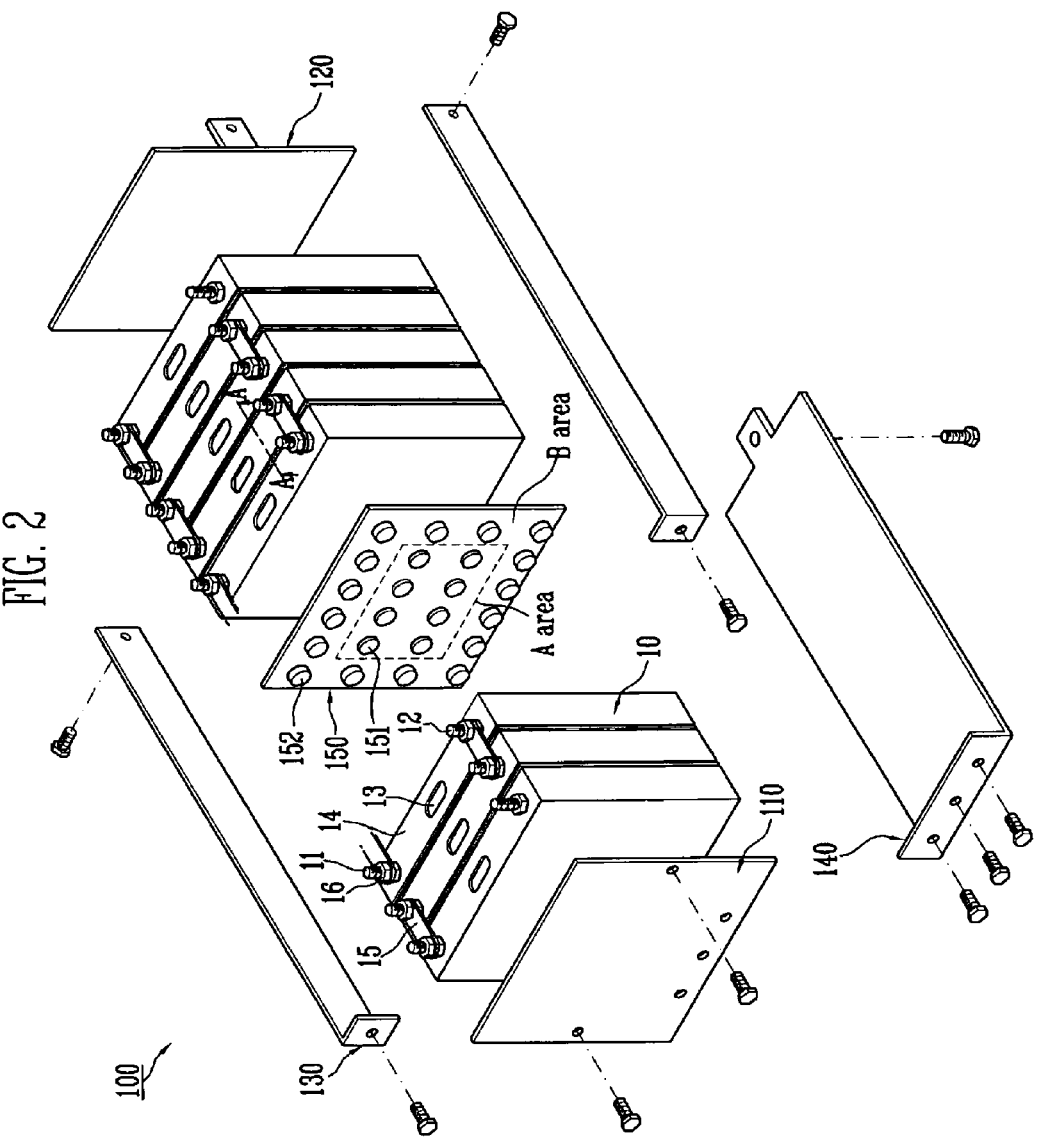

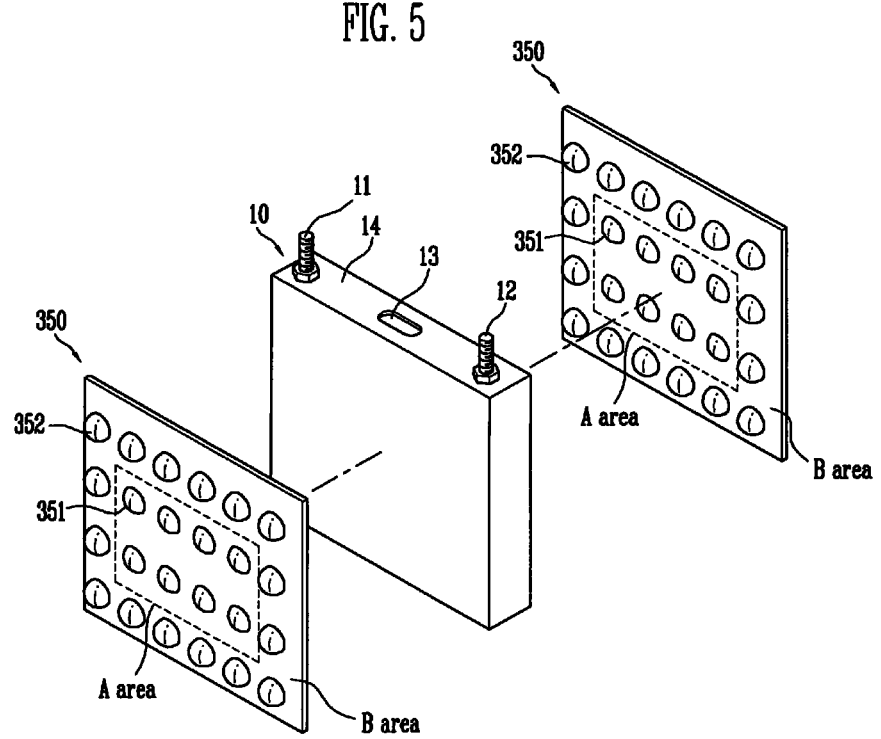

BATTERY MODULE

BACKGROUND

1. Field

An embodiment relates to a battery module, and more particularly, to a battery module in which a structure of fixing a plurality of battery cells is improved.

2. Description of the Related Art

Recently, a high output battery module using high energy density non-aqueous electrolyte is being developed. The high output and large capacity battery module is formed by serially coupling a plurality of battery cells to each other so that the battery module may be used for driving an apparatus that requires large power, such as, for example, the motor of an electric vehicle.

The battery cell includes an electrode assembly consisting of a positive electrode plate and a negative electrode plate and an electrolyte and may generate energy by an electrochemical reaction between the positive and negative electrode plates and the electrolyte.

SUMMARY

According to an embodiment, there is provided a battery module, including a plurality of battery cells arranged in one direction, barriers interposed among the plurality of battery cells, a pair of first and second end plates arranged outside the battery cells, and coupling members that couple the first and second end plates, wherein at least one of the barriers includes at least one protrusion that provides a step difference between the protrusion and a surface of the barrier.

The barrier comprises a plurality of protrusions and wherein at least one of the protrusions varies in size from other ones of the protrusions.

A center portion of the barrier may have a smaller step difference than a peripheral portion.

The protrusions may be provided on at least one surface of the barrier to contact at least one of the battery cells.

The protrusions may include first protrusions and second protrusions. The first protrusions may provide a smaller step difference than the second protrusions.

The first protrusions may be provided at a center portion of a surface of the barrier that faces one of the battery cells. The second protrusions may be provided at a peripheral portion of the surface of the barrier that faces the one of the battery cells of the first protrusions.

An area occupied by the first protrusions may be 20% to 50% of an entire area of the barrier.

An area occupied by the second protrusions may be 50% to 80% of an entire area of the barrier.

A height of the first protrusions may be 70% to 95% of a height of the second protrusions.

The first protrusions may include an elastic substance, and the second protrusions may lack an elastic substance.

The protrusions may be cylindrical or hemispherical.

The surface of the barrier may correspond in area to a side of the battery cell.

The coupling members may include side brackets that support respective sides of the battery cells and a bottom bracket that supports bottom surfaces of battery cells.

According to an embodiment, there is provided a battery module, including, a plurality of battery cells arranged in one direction and having side surfaces in orthogonal disposition relative to the one direction, and a plurality of barriers, each barrier being interposed between adjacent ones of the plurality of battery cells, wherein, each barrier includes barrier surfaces facing the side surfaces of the adjacent ones of the plurality of battery cells, and wherein each barrier surface includes a plurality of protrusions extending therefrom.

The plurality of protrusions may include first protrusions at a center portion of each barrier surface, each first protrusion having a first height, and second protrusions at a peripheral portion of each barrier surface surrounding the first protrusions, each second protrusion having a second height. The second height may be greater than the first height.

The second protrusions may contact the side surfaces of the adjacent ones of the plurality of battery cells.

The center portion of the major planar surface may occupy 20 to 50% of an entire area of the major planar surface and the peripheral portion of the major planar surface may occupy 50 to 80% of the entire area of the major planar surface.

The first protrusions may include an elastic substance, and the second protrusions may lack an elastic substance.

The protrusions may be cylindrical or hemispherical.

The battery module may further include a pair of first and second end plates arranged outside the battery cells, and coupling members that couple the first and second end plates.

BRIEF DESCRIPTION OF THE DRAWINGS

The above and other features will become more apparent to those of ordinary skill in the art by describing in detail exemplary embodiments with reference to the attached drawings, in which:

FIG. 2 illustrates an exploded perspective view relating to the battery module according to the embodiment of FIG. 1;

FIG. 5 illustrates a perspective view relating to barriers and a battery cell according to still another embodiment.

DETAILED DESCRIPTION

Figure 1:
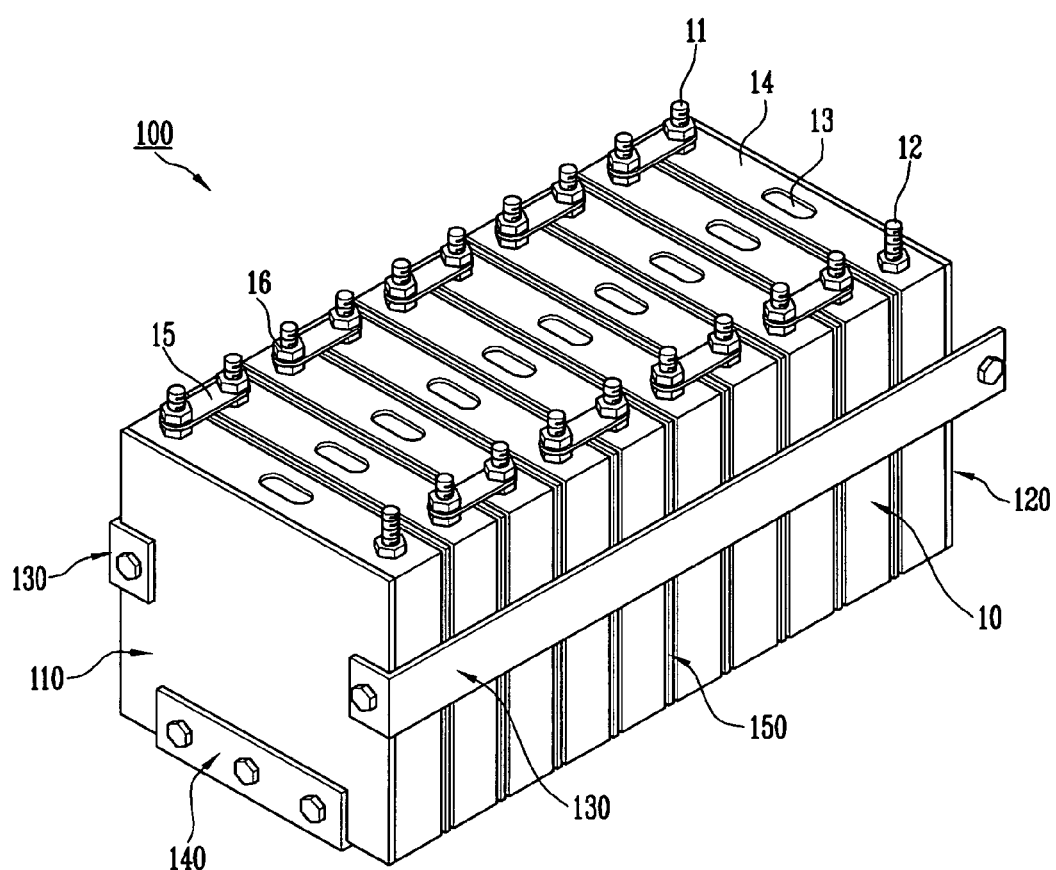
FIG. 1 illustrates a perspective view relating to a battery module according to an embodiment.

Korean Patent Application No. 10-2010-0116860, filed on Nov. 23, 2010, in the Korean Intellectual Property Office, and entitled: "Battery Module" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

An exemplary embodiment will be described with reference to FIGS. 1 to 3.

FIG. 1 is a perspective view illustrating a battery module according to an embodiment. FIG. 2 is an exploded perspective view illustrating the battery module according to the embodiment.

Referring to FIGS. 1 and 2, a battery module 100 according to an exemplary embodiment may include a plurality of battery cells 10 arranged in one direction, barriers 150 interposed between the plurality of battery cells 10, a pair of first and second end plates 110 and 120 provided outside the battery cells 10, and coupling members 130 and 140 for coupling the first and second end plates 110 and 120. The barrier 150 includes at least one protrusion 151 and 152 so that the protrusions 151 and 152 have step differences.

The battery cell 10 may include a battery case having an opening and a cap plate 14 for sealing up the opening. An electrode assembly including a positive electrode plate, a negative electrode plate, and a separator interposed between the positive electrode plate and the negative electrode plate and an electrolyte may be accommodated in the battery case. In addition, a positive terminal 11 coupled to the positive electrode plate and a negative terminal 12 coupled to the negative electrode plate may be provided to protrude outside at both ends of the cap plate 14. The positive electrode plate and the negative electrode plate generate energy in reaction to the electrolyte. The energy generated at this time is transmitted to the outside through the positive terminal 11 and the negative terminal 12.

In addition, a vent 13 may be provided between the positive terminal 11 and the negative terminal 12 of the cap plate 14. The vent 13 functions as a path through which a gas is discharged to the outside when the pressure of the gas is not less than a predetermined level in the battery cell 10 to prevent the battery cell 10 from being damaged.

The battery module 100 may include the plurality of battery cells 10 between the first and second end plates 110 and 120. The plurality of battery cells 10 may be arranged in one direction. The battery cells 10 may be arranged to run parallel with each other so that large front surfaces face each other. Therefore, the vents 13 provided in the centers of the cap plates 14 of the battery cells 10 may be linearly arranged. The positive terminals 11 and the negative terminals 12 of two adjacent battery cells 10 may be electrically coupled to each other through bus bars 15. The bus bars 15 may have holes through which the positive terminals 11 and the negative terminals 12 pass and may be fixed to the positive terminals 11 and the negative terminals 12 by nuts 16.

According to the present embodiment, the battery cell 10 is a polygonal battery. The battery cell 10 may be a lithium ion secondary battery. Embodiments are not limited to the above. Various types and configurations of batteries such as a lithium polymer battery or a cylindrical battery may be used.

The battery module 100 may include a pair of first and second end plates 110 and 120 separated from each other and coupling members 130 and 140 that couple the first and second end plates 110 and 120. The coupling members 130 and 140 may be brackets. One end of each of the brackets 130 and 140 may be fastened to the first end plate 110 and the other end of each of the brackets 130 and 140 may be fastened to the second end plate 120. The first and second end plates 110 and 120 and the brackets 130 and 140 may be fastened to each other by members such as bolts and nuts.

The brackets 130 and 140 may include first and second brackets 130 and 140. The first brackets 130 may be side brackets that support respective sides of the battery cells 10. The second bracket 140 may be a bottom bracket that supports the bottom surfaces of the battery cells 10. The plurality of battery cells 10 may be arranged between the first and second end plates 110 and 120. The battery cells 10 may be fixed to the space partitioned off by the side brackets 130 and the bottom bracket 140 so that the battery cells 10 do not easily vibrate due to external shock. According to the present embodiment, the brackets 130 and 140 may be referred to as the side brackets 130 and the bottom bracket 140. The side brackets 130 and the bottom bracket 140 may couple only the first and second end plates 110 and 120. There are no limitations on the positions and the shapes of the brackets 130 and 140.

The first and second end plates 110 and 120 may be arranged to surface contact the large surfaces of the outermost battery cells 10 to press the plurality of battery cells 10 towards the inside of the battery module. In the plurality of battery cells 10 supported by the first and second end plates 110 and 120 and the side brackets 130 and the bottom bracket 140, the positive terminals 11 and the negative terminals 12 may be alternately arranged to be serially coupled to each other so that the battery cells 10 may be serially coupled to each other. The coupling structure of the battery cells 10 and the number of battery cells 10 may vary with the design of the battery module 100.

Figure 3A:
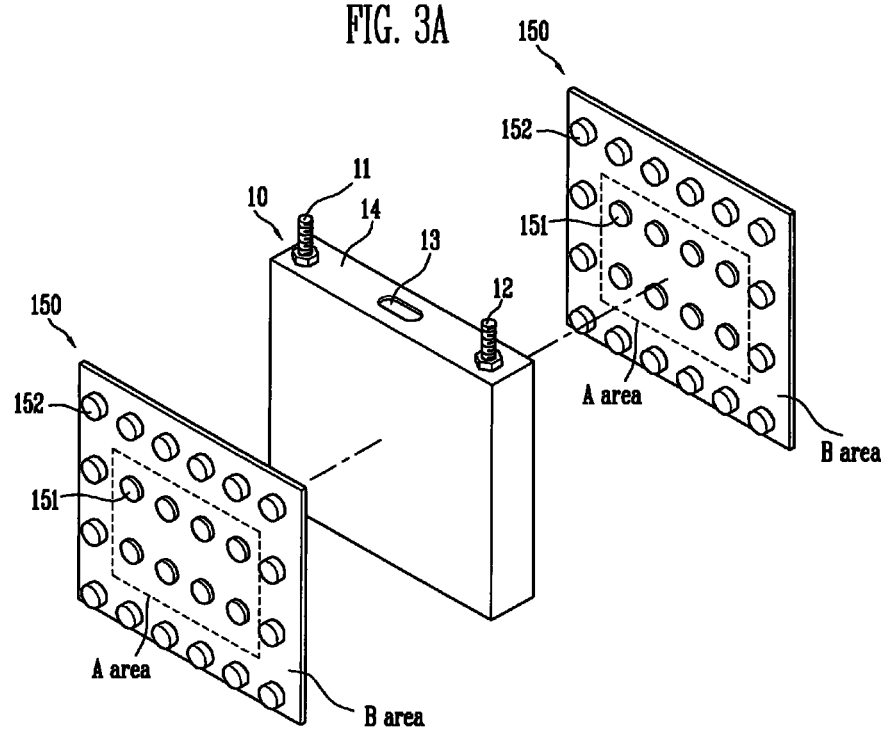
FIG. 3A illustrates a perspective view relating to the barriers and a battery cell of FIG. 2.
Figure 3B:
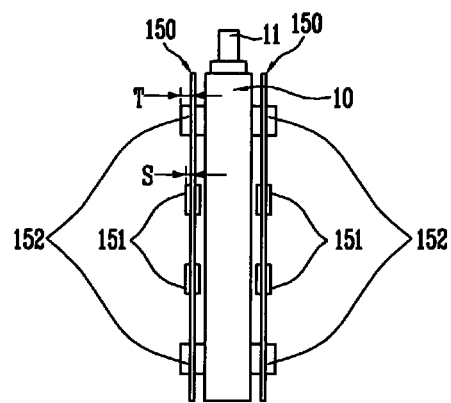
FIG. 3B illustrates a sectional view taken along the line A-A of FIG. 2.

FIG. 3A is a perspective view illustrating the barriers 150 and the battery cell 10 of FIG. 2. FIG. 3B is a sectional view taken along the line A-A.

Referring to FIGS. 3A and 3B, the barriers 150 may be provided between adjacent ones of the plurality of battery cells 10. The barrier 150 may be in the form of a thin plate, and the center of the barrier may have a smaller step difference than a peripheral part. The protrusions 151 and 152 may be provided on at least one side of the first and second surfaces of the barrier 150. The protrusions 151 and 152 may be provided on the surface where the barrier 150 contacts the battery cell 10. The surface where the barrier 150 contacts the battery cell 10 may have a shape corresponding to the battery cell 10.

The barrier 150 may be interposed between adjacent battery cells 10 so that a space may be formed between the battery cells 10. The space functions as a channel through which heat is discharged so that the heat generated by the battery cells 10 is not accumulated. In addition, the space may form the channel of a cooling medium for cooling the battery cells 10.

In addition, the barriers 150 separate the adjacent battery cells 10 and fix the plurality of battery cells 10. The barriers 150 may be provided in the space partitioned off by the first and second end plates 110 and 120, the side brackets 130, and the bottom bracket 140 together with the battery cells 10. Therefore, the first and second surfaces of the barrier 150 may have shapes corresponding to the battery cell so that the barriers 150 do not vibrate in the space and that the battery cells 10 are firmly fixed.

The protrusions 151 and 152 provided in the barrier 150 may include the first and second protrusions 151 and 152. The first protrusions 151 may have a smaller step difference than the second protrusions 152. The first protrusions 151 may be provided in the center (region A) of the barrier 150 and the second protrusions 152 may be provided in the peripheral part (region B) of the first protrusions 151. The peripheral part (region B) may surround the center (region A). A boundary between the region A and the region B may be the center between the first protrusions 151 and the second protrusions 152.

In the barrier 150, the height S of the first protrusion 151 may be smaller than the height T of the second protrusion 152. When the battery cell 10 is in a condition in which the thickness of the battery cell 10 has not yet increased, the thickness of the batter cell 10 may be uniform. In such a case, only the second protrusions 152 may contact the battery cell 10 and the first protrusions 151 may be separated from the battery cell 10 by a predetermined distance. As described above, the space between the first protrusions 151 and the battery cell 10 offsets the increase in the thickness of the battery cell 10 to reduce the swelling force toward the first and second end plates 110 and 120.

In the battery module 100, the barriers 150 are interposed between adjacent ones of the plurality of battery cells 10 arranged in one direction. The barrier 150 includes the protrusions 151 and 152 having different heights on the surface that contacts the large surface of the adjacent battery 10.

As the number of times of charge and discharge of the battery cells 10 increases, the battery cells 10 may deteriorate so that the gas may be generated. The gas generated inside the battery cells 10 may increase the thickness of the battery cells 10. The amount of increase in the thickness of the battery cell 10 is greatest at the center of the battery cell 10. As described above, the battery cells 10 whose thickness is increased apply the force that pushes the first and second end plates 110 and 120 of the battery cells 10 toward the outside. Herein, the applied force is referred to as the swelling force.

The barrier 150 provided in the battery module 100 may be divided into the region A and the region B. The region A may be provided in a position corresponding to the center of the battery cell 10. The height S of the first protrusions 151 provided in the region A may be relatively small so that the space that accommodates the increase in the thickness of the battery cell 10 may be provided. Therefore, the swelling force applied to the first and second end plates 110 and 120 may be reduced so that it is possible to prevent the shape of the battery module 100 from being twisted or the battery module 100 from being damaged.

In addition, the height T of the second protrusions 152 provided in the region B may be relatively large so that the part of the battery cell 10 where the amount of increase in the thickness of the battery cell 10 is small may be firmly fixed. The battery cells 10 may not easily vibrate due to external shock or vibration. Therefore, the battery module 100 may be stably used.

The first and second protrusions 151 and 152 provided in the barrier 150 may be divided into the region A and the region B. However, embodiments are not limited to the above. A difference between the heights of the region A and the region B and the heights S and T of the first and second protrusions 151 and 152 may vary from what is described above, considering the characteristics of the battery cells 10 and the channel of the cooling medium.

The region A occupied by the first protrusions 151 may be 20% to 50% of the entire area of the barrier 150. When the region A occupied by the first protrusions 151 is less than 20%, it may be difficult to provide enough space to accommodate the increase in the thickness of the battery cells 10 so that the first and second end plates 110 and 120 may be deformed by the swelling force applied to the first and second end plates 110 and 120. In addition, when the region A occupied by the first protrusions 151 is larger than 50%, is the region B may not be large enough to fix the battery cells 10. Therefore, the battery cells 10 may easily vibrate in the battery module 100 to cause a problem in electric coupling.

The region B occupied by the second protrusions 152 may be 50% to 80% of the entire area of the barrier 150. When the area of the second protrusions 152 is less than 50%, a force of fixing the sides of the battery cells 10 may not be enough so that the battery cells 10 may easily vibrate due to external shock. When the area occupied by the second protrusions 152 is larger than 80%, it may be difficult to provide enough space to accommodate the increase in the thickness of the battery cells 10.

The height S of the first protrusions 151 may be 70% to 95% of the height T of the second protrusions 152. When the height S of the first protrusions 151 is less than 70% of the height T of the second protrusions 152, the step difference may be severe in the barrier 150 and the region in which the first protrusions 151 do not contact the battery cell 10 is generated so that the battery cells 10 may not be firmly fixed. In addition, when the height S of the first protrusions 151 is greater than 95% of the height T of the second protrusions 152, the step difference between the first protrusions 151 and the second protrusions 152 may not be enough so that it may be difficult to provide enough space for the increase in the thickness of the battery cells 10.

Hereinafter, the other embodiments will be described with reference to FIGS. 4 and 5. Since the elements and the operations of the embodiments illustrated in FIGS. 4 and 5 are similar to those of the embodiments illustrated in FIGS. 1 to 3 the similar contents will not be described again in detail, and the differing aspects will be described in detail.

Figure 4:
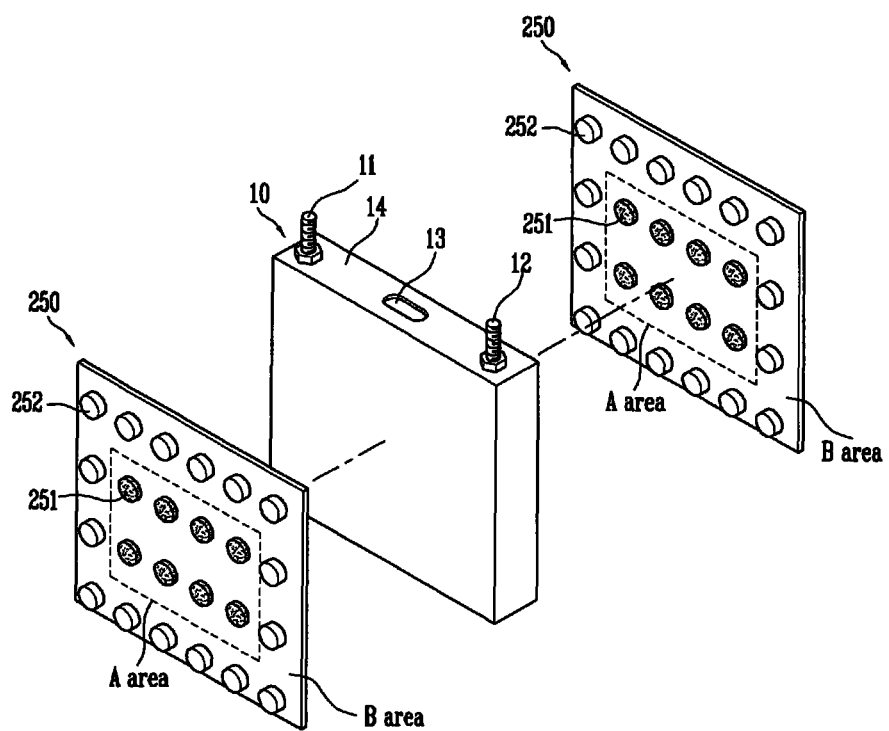
FIG. 4 illustrates a perspective view relating to barriers and a battery cell according to another embodiment.

FIG. 4 is a perspective view of barriers 250 and a battery cell 10 according to another embodiment.

Referring to FIG. 4, the barrier 250 is interposed between the battery cells 10 and first protrusions 251 and second protrusions 252 may be provided to have step differences on the surface that contacts the battery cell 10 of the barrier 252.

The first protrusions 251 and the second protrusions 252 may be formed of different materials. For example, the first protrusions 251 may be formed of an elastic substance and the second protrusions 252 may be formed of a substance that is not elastic but that has strength. For example, the first protrusions 251 may be provided in the center where the amount of increase in the thickness of the battery cells 10 that deteriorate as charge and discharge proceed is relatively large. The first protrusions 251 may have a smaller step difference than the second protrusions 252. The first protrusions 251 may be formed of an elastic substance having elasticity so that a space may be elastically provided with respect to the amount of increase in the thickness of the battery cells 10. Therefore, in processes of manufacturing the barriers 250 of the battery cells 10, the defect rate in accordance with the degrees of the step differences may be reduced.

In addition, the second protrusions 252 may be formed of a substance that is not elastic. The second protrusions 252 may be provided around the barrier 250 to support the battery cell 10. Therefore, if the second protrusions 252 were to be formed of an elastic substance, the battery cell 10 might vibrate due to the elasticity of the elastic substance.

FIG. 5 is a perspective view illustrating the barriers 350 and the battery cell 10 according to another embodiment.

Referring to FIG. 5, the barrier 350 is interposed between the battery cells 10 to be provided to correspond to the large surface of the battery cell 10. The barrier 350 may include first and second protrusions 351 and 352 provided to have step differences. The shapes of the first and second protrusions 351 and 352 may be hemispherical. The first and second protrusions 351 and 352 provided in the barrier 350 may be integrated with the barrier 350 or may be separately manufactured to be attached to the barrier 350. In addition, the shapes of the first and second protrusions 351 and 352 may be hemispherical according to the present embodiment. It is to be understood that in the embodiments described herein, the shapes of the first and second protrusions may vary from what is shown in FIGS. 2, 3A, 3B, 4 and 5. In particular, the fixing of the battery cells and the accommodation of swelling of the battery cells may be achieved by providing the first protrusions 351 to have smaller step difference than the second protrusions 352.

By way of summation and review, when energy is generated by an electro-chemical reaction between the positive and negative electrode plates and the electrolyte of battery cells a gas may be generated inside the battery cells due to a sub-reaction. The generation of gas may cause the battery cells to increase in thickness. The increase in thickness of the battery cells may affect the shape of the battery module formed by coupling the plurality of battery cells and may prevent the battery cells from being firmly fixed.

The present embodiments provide a battery module in which battery cells are fixed regardless of the increase in the thickness of the battery cells. The present embodiments also provide a battery module in which the members for fixing a plurality of battery cells are reduced. In particular, the barriers described herein may flexibly correspond to a deformation caused by an increase in the thickness of the battery cells so that it is possible to provide a battery module in which the battery cells are firmly coupled.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A battery module, comprising:
a plurality of battery cells arranged in a first direction;
barriers interposed among the plurality of battery cells, each barrier being in a form of a barrier plate having a plurality of protrusions protruding from a common surface of the barrier plate, the common surface of the barrier plate facing one of the battery cells, the protrusions providing a step difference between the protrusions and the common surface of the barrier plate, the protrusions including first protrusions and second protrusions, the first protrusions providing a smaller step difference than the second protrusions;
a pair of first and second end plates arranged outside the battery cells; and
coupling members that couple the first and second end plates,
wherein a center portion of the barrier has a smaller step difference than a peripheral portion,
wherein:
the first protrusions are provided at a center portion of a surface of the barrier plate that faces one of the battery cells, and
the second protrusions are provided on a peripheral portion of the surface of the barrier plate that faces the one of the battery cells, the peripheral portion extending along outer sides of the center portion to surround the central portion of the barrier plate, such that the second protrusions completely surround the first protrusions, and wherein:
the first protrusions include an elastic substance, and
the second protrusions do not include an elastic substance.

2. The battery module as claimed in claim 1, wherein the protrusions on the common surface of the barrier contact at least one of the battery cells.

3. The battery module as claimed in claim 1, wherein an area occupied by the first protrusions is 20% to 50% of an entire area of the barrier.

4. The battery module as claimed in claim 1, wherein an area occupied by the second protrusions is 50% to 80% of an entire area of the barrier.

5. The battery module as claimed in claim 1, wherein a height of the first protrusions is 70% to 95% of a height of the second protrusions.

6. The battery module as claimed in claim 1, wherein the protrusions are cylindrical or hemispherical.

7. The battery module as claimed in claim 1, wherein the surface of the barrier corresponds in area to a side of the battery cell.

8. The battery module as claimed in claim 1, wherein the coupling members include side brackets that support respective sides of the battery cells and a bottom bracket that supports bottom surfaces of battery cells.

9. A battery module, comprising:
a plurality of battery cells arranged in a first direction and having side surfaces; and
a plurality of barriers, each barrier being interposed between adjacent ones of the plurality of battery cells;
wherein,
each barrier includes two barrier surfaces, one of the barrier surfaces facing the side surface of one of the plurality of battery cells and another one of the barrier surfaces facing the side surface of an adjacent one of the battery cells,
wherein each barrier surface includes a plurality of protrusions extending therefrom, the plurality of protrusions includes first protrusions protruding from each barrier surface at a center portion of each barrier surface, each first protrusion having a first height, and second protrusions protruding from each barrier surface at a peripheral portion of each barrier surface, the peripheral portion surrounding the center portion, such that the second protrusions surround the first protrusions, each second protrusion having a second height, wherein the second height is greater than the first height,
wherein the peripheral portion surrounds the center portion of the barrier plate, such that the peripheral portion extending along outer sides of the center portion to completely surround the central portion of the barrier plate and the second protrusions completely surround the first protrusions, and
wherein:
the first protrusions include an elastic substance, and
the second protrusions do not include an elastic substance.

10. The battery module as claimed in claim 9, wherein the second protrusions contact the side surfaces of the adjacent ones of the plurality of battery cells.

11. The battery module as claimed in claim 9, wherein the center portion of each barrier surface occupies 20 to 50% of an entire area of such barrier surface and the peripheral portion of such barrier surface occupies 50 to 80% of the entire area thereof.

12. The battery module as claimed in claim 9, wherein the protrusions are cylindrical or hemispherical.

13. The battery module as claimed in claim 9, further comprising:
- a pair of first and second end plates arranged outside the battery cells; and
- coupling members that couple the first and second end plates.

\* \* \* \* \*